(12) United States Patent
Biester

(10) Patent No.: US 7,681,861 B2
(45) Date of Patent: Mar. 23, 2010

(54) DOSAGE FEED DEVICE FOR ADDITIVE FLUIDS

(75) Inventor: Klaus Biester, Wienhausen (DE)

(73) Assignee: Cameron International Corporation, Houston, TX (US)

( * ) Notice: Subject to any disclaimer, the term of this patent is extended or adjusted under 35 U.S.C. 154(b) by 492 days.

(21) Appl. No.: 10/564,592

(22) PCT Filed: Jul. 16, 2004

(86) PCT No.: PCT/EP2004/007950

§ 371 (c)(1), (2), (4) Date: Jan. 13, 2006

(87) PCT Pub. No.: WO2005/015018

PCT Pub. Date: Feb. 17, 2005

(65) Prior Publication Data

US 2006/0163509 A1  Jul. 27, 2006

(30) Foreign Application Priority Data

Jul. 17, 2003 (DE) ............... 203 11 029

(51) Int. Cl.
*F16K 47/00* (2006.01)
*F16L 55/02* (2006.01)
(52) U.S. Cl. ............ 251/121; 251/129.11; 251/118
(58) Field of Classification Search .......... 251/118, 251/120, 129.11, 248, 121
See application file for complete search history.

(56) References Cited

U.S. PATENT DOCUMENTS

| 2,594,577 | A | | 4/1952 | McFarland |
| 2,789,510 | A | | 4/1957 | Meynig |
| 4,159,658 | A | * | 7/1979 | Parkinson ............... 74/813 L |
| 4,634,095 | A | * | 1/1987 | Taylor ................... 251/121 |
| 5,497,672 | A | * | 3/1996 | Appleford et al. ........ 74/89.29 |
| 5,515,674 | A | * | 5/1996 | Kaufmann, Jr. ............ 60/308 |
| 5,967,164 | A | * | 10/1999 | Denda et al. ............. 137/1 |

FOREIGN PATENT DOCUMENTS

WO   0223138   3/2002

OTHER PUBLICATIONS

Examination Report for Appl. No. GB0603034.0 dated Sep. 8, 2006; (2 p.).

* cited by examiner

*Primary Examiner*—John K Fristoe, Jr.
(74) *Attorney, Agent, or Firm*—Conley Rose, P.C.

(57) ABSTRACT

Metering device in particular for metering an additive in the field of oil exploration with a metering element adjustable by an adjusting means. To improve such a metering device in that already with minimal movement of the adjusting means in a constructive simple way a particular amount of additive is added to raw material and also to quickly interrupt the metering, the metering element comprises a metering gap and a valve means arranged behind the metering gap downstream in fluids moving direction.

26 Claims, 3 Drawing Sheets

DOSAGE FEED DEVICE FOR ADDITIVE FLUIDS

CROSS-REFERENCE TO RELATED APPLICATION

The present application claims priority to PCT/EP2004/007950 filed 16 Jul. 2004 and to German Application No. 203 11 029.3 filed 17 Jul. 2003, all hereby incorporated herein by reference.

STATEMENT REGARDING FEDERALLY SPONSORED RESEARCH OR DEVELOPMENT

Not Applicable.

BACKGROUND OF THE INVENTION

The invention relates to a dosage feed device, in particular for the dosage feed of an additive fluid in crude oil production, with a dosing element adjustable by an adjustment device.

This sort of additive fluid is added in the production of both crude oil and natural gas. It is used, for example, for inhibiting the formation of hydrates, inhibiting corrosion, preventing the deposition of crusts, for the suppression of wax precipitates, etc. Normally, this type of additive fluid is termed an inhibitor. The composition of the inhibitor depends on the composition of the crude oil or natural gas and is also dosed in different quantities.

A suitable dosage feed device is known from practice, whereby the inhibitor is added relatively early in the production of the raw material using the appropriate dosing element, which generally occurs on exit from the corresponding bed of deposits. The inhibitor is later removed before further processing of the raw material occurs in a refinery or similar facility.

SUMMARY OF THE PREFERRED EMBODIMENTS

The object of the invention is to improve a dosage feed device of the type mentioned at the beginning such that already with a minimum movement of the adjustment device in a constructively simple way, a specific quantity of additive fluid can be added to the raw material, whereby a similarly quick interruption in the dosage feed can also occur.

This object is solved by the features of claim 1.

According to the invention, the dosing element exhibits a dosing gap and a valve device positioned following the gap in the direction of flow of the additive fluid. The amount of the additive fluid to be passed to the raw material is defined or, if necessary, can be varied by the dosing gap, whereas a fast initiation of the dosage feed and also a fast interruption of the dosage feed occurs through the valve device. According to the invention therefore, a device for the quantitative dosage feed is used in combination with a valve device essentially formed as an opening/closing device. The combination of both elements is constructed to be compact and simple and can also be actuated by the adjustment device safely and reproducibly at places where access is difficult.

The dosing gap can be defined such that after appropriate opening of the valve device a constant quantity of additive fluid is always fed. Consequently where necessary, variation of an opening area of the dosing gap is possible, for example, depending on the composition of the raw material to which additive fluid is to be fed, the dosing gap is set appropriately before application of the dosage feed device. Another possibility is that the dosing gap with its opening area can be directly adjusted variably at the point of application.

A simple realisation of a dosing gap is conceivable in which it is formed between a dosing cone and a counter element, whereby the dosing cone and counter element are movable relative to one another. Due to the relative movement the opening area of the dosing gap is varied. This variation can occur through once-only adjustment and then retention of the corresponding opening area, but it can also though be remotely controlled and can also be implemented at the point of application by appropriate relative movement of the dosing cone and counter element.

The dosing gap itself can be formed in various ways. It is conceivable that it is, for example, composed of a number of slit-shaped openings or also formed with an annular shape between the dosing cone and the counter element.

In a simply constructed embodiment the dosing cone can be formed as an end section of a displaceable sleeve which expands conically in the direction of the fluid flow, whereby at least this end section is arranged for displacement in a guide sleeve as counter element. By appropriate displacement of the displaceable sleeve with the conical end section, the opening area of the dosing gap is varied. It is, of course, also conceivable that the displaceable sleeve with conical end section is fixed and the guide sleeve moves appropriately along the end section, whereby the opening area of the dosing gap is also variable.

In order to realise guidance of the displaceable sleeve independently of the formation and variation of the dosing gap, a guide section of the displaceable sleeve can be supported for displacement in a support sleeve between an extended and a withdrawn position. In the extended position of the displaceable sleeve the maximum opening area of the dosing gap is produced and in the withdrawn position the opening area of the dosing gap can be reduced to zero if necessary, i.e. the dosing gap is closed.

The displaceable sleeve can be subject to spring pressure in the direction of the withdrawn position in order to move the displaceable sleeve in a simple way into its withdrawn position, especially in an emergency, such as the failure of the adjustment device.

In order to define the withdrawn position in a simple manner, an especially annular stop can be spaced essentially radially outwards from the displaceable sleeve for defining the withdrawn position. In the withdrawn position this stop contacts the supporting sleeve at one end.

In order to realise the spring pressure constructively simply, a compression spring can be arranged between the support sleeve and a first sleeve end of the displaceable sleeve.

In order to not have to form the first sleeve end in a special way for the support of the compression spring, a support ring can be arranged on the first end of the sleeve. This support ring can be attached there, especially releasably.

In order to separate the valve device in a simple manner spatially from the dosing gap and at the same time to obtain a constructively simple solution for closing the valve device, a valve-seat sleeve can be arranged between the valve device and the dosing gap in the flow channel which is contacted on one side by an appropriate valve element in the valve closure position. This means that with an open valve device or with a valve element that does not contact the valve-seat sleeve, the additive fluid flows through the valve-seat sleeve in the direction of the raw material to which it is to be dosed. In the closed position of the valve device the valve-seat sleeve is closed by contact of the valve element, so that in principle the valve-seat sleeve can be considered as part of the valve device. Depending on the shape of the valve-seat sleeve, the valve element exhibits an appropriate shape. There is also the possibility of arranging the valve element in the interior of the valve-seat sleeve in the valve-closed position so that it closes the corresponding flow channel there.

A simple realisation of an appropriate valve device can be seen in that it is a non-return valve, subjected to a force in the direction of the valve-seat sleeve. In this way the valve element is opened in opposition to the applied force for dosing the additive fluid and is used especially as an emergency closure mechanism if the corresponding adjustment device fails. This means that the valve device is a normally closed valve device or a valve which is closed in the idle state.

A simple interaction between the valve element and the valve-seat sleeve can be seen in that the essentially spherical valve element contacts a corresponding opening edge of the valve-seat sleeve in the valve-closed position, thus tightly closing the interior of the valve-seat sleeve. Consequently, no further additive fluid can flow through the valve-seat sleeve for dosage feed in the direction of the corresponding raw material.

In order to be able to arrange the valve-seat sleeve relatively to the guide sleeve at a fixed distance, a spacer sleeve can be arranged between the valve-seat sleeve and the guide sleeve. With this sleeve, for example, a flange of the valve-seat sleeve, protruding radially outwards can be pressed against a protrusion of a corresponding housing part, protruding correspondingly radially inwards, where it is held in contact.

For the simple accommodation and support of the valve element, it can be arranged in an essentially cup-shaped element receptacle, between which and an inner side of a housing hole at least one fluid opening is formed. This means that with the valve open the additive fluid flows around the element receptacle and through the at least one fluid opening. Of course, there is also the possibility of arranging many such fluid openings, for example, in the circumferential direction of the element receptacle between it and the inner side of the housing hole.

In order to provide a certain quantity of additive fluid quickly, the dosing gap can exhibit a certain opening area in the withdrawn position of the displaceable sleeve. This is greater than zero so that the quantity of the additive fluid determined by the dosing gap can flow in the direction of the raw material just by opening the valve device. Of course, there is also the possibility of varying this specified opening area depending on the type and quantity of the raw material.

In order to remove the valve element from its sealed seating on the valve-seat sleeve in a simple manner, an actuating plunger, which is in contact at one supporting end with the valve element, can be supported for displacement within the displaceable sleeve, spacer sleeve and valve-seat sleeve. The valve element is appropriately removed from the valve-seat sleeve by displacement of this actuating plunger and the corresponding valve device or the appropriate non-return valve is opened against the spring pressure.

With a simple embodiment the actuating plunger can be movably joined to the adjustment device by its moving end facing away from the support end. Complex movement transfer mechanisms between the actuating plunger and adjustment device are not necessary so that the dosage feed device is overall simply constructed.

In order, when moving the actuating plunger in the axial direction, to prevent the opening area of the dosing gap due to its analogous movement from also being immediately varied when initiating this movement, the movement end can protrude by a certain delay length from the first sleeve end of the displaceable sleeve. This means that first the actuating plunger is displaced by this delay length for opening the valve device and it is only after the delay length is pushed into the first sleeve end that a corresponding displacement of the displaceable sleeve also occurs and therefore too, a variation of the dosing gap.

There are various possibilities of externally feeding additive fluid to the dosage feed device. To achieve this, an appropriate device housing exhibits at least one hole through which the additive fluid is fed from an appropriate reservoir into the flow channel, controlled for quantity by the dosing gap and the valve device.

A simple feed is conceivable in which at least one additive fluid feed flows into an annular space of the flow channel between the guide sleeve and the support sleeve.

In order to fill the complete available interior space in the dosage feed device with additive fluid, at least one connecting hole can carry the support sleeve through in the direction of the first sleeve end. Through this connecting hole additive fluid is also fed appropriately into the space around the compression spring out of the annular space so that it also surrounds the first sleeve end and, for example, the movable end of the actuating plunger.

Various adjustment devices for the axial adjustment of the actuating plunger and displaceable sleeve are conceivable. These adjustment devices are characterised by a linear movement in the axial direction. However, to electrify the dosage feed device completely and to design it reliably and redundantly, without feed lines for a medium subject to pressure, the adjustment device can exhibit at least a spindle drive, a reduction gear, in particular in the form of a so-called harmonic drive, a helically toothed spur gear and a drive motor. The drive motor is an electric motor which acts on a drive shaft. This rotates a helically toothed spur wheel which engages another helically toothed spur wheel with a larger diameter. In this way an initial reduction of the rotational speed of the electric motor occurs. The spur wheel with the larger diameter transfers the rotational movement to the harmonic drive which, after further reduction, transfers the rotational movement to an appropriate part of the spindle drive. The spindle drive is then movably connected to the actuating plunger for its movement in the axial direction.

With a simple embodiment of such a spindle drive, it exhibits a rotationally rigid, but axially movable threaded spindle. The latter is joined appropriately to the actuating plunger, whereby there is also the possibility of arranging another actuating rod between both depending on the size of the dosage feed device in the axial direction. Preferably, a recirculating roller-bearing spindle is used as the spindle drive.

With regard to the harmonic drive, it should be noted that the spur wheel with the larger diameter is joined rotationally rigidly to a wave generator of the harmonic drive, whereby the rotation of the wave generator leads to an elastic deflection of an appropriately flexible toothed sleeve on two opposing ends of the toothed sleeve so that their outer teeth engage with suitable inner teeth of a rotationally rigid ring element. The appropriate movable connection to the spindle drive occurs by means of the flexible toothed sleeve.

The dosage feed device according to the invention can be provided both as an add-on or integrated part of a tree, for example, on the sea bed. There is also the possibility that the dosage feed device is designed such that it is constructed for remote control and can be replaced on the tree by a suitable vehicle or robot. For this purpose it is to be considered advantageous if an appropriate device housing of the dosage feed device exhibits a number of insertion bevels on its housing outer side. These insertion bevels aid in fitting the dosage feed device to a corresponding receptacle opening on the tree in which the dosage feed device is to be inserted at least partially.

BRIEF DESCRIPTION OF THE DRAWINGS

In the following, advantageous embodiments of the invention are explained in more detail based on the figures enclosed in the drawing.

The following are shown.

DETAILED DESCRIPTION OF THE PREFERRED EMBODIMENTS

Figure 1:
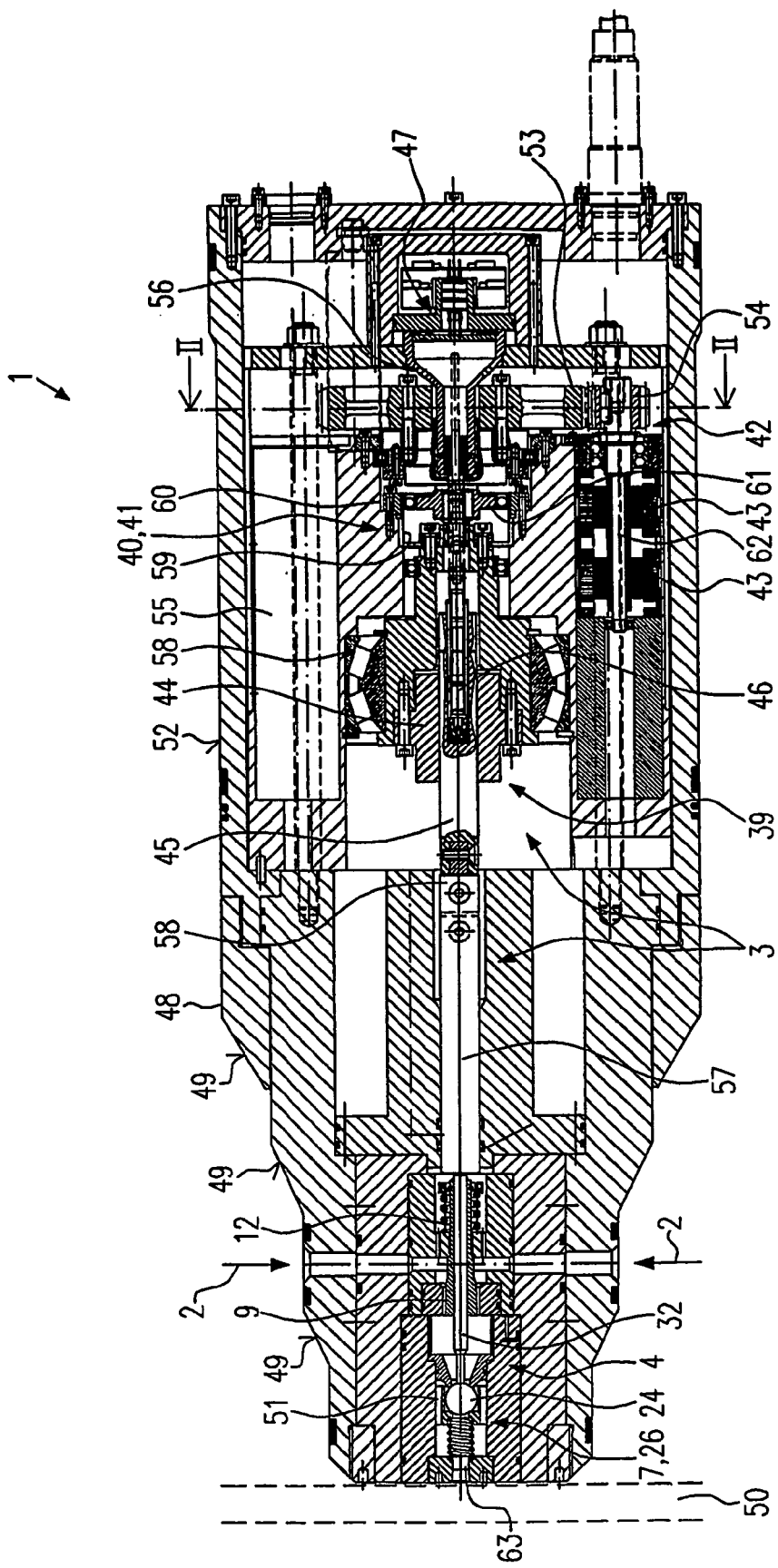
FIG. 1 a longitudinal section through a first embodiment of a dosage feed device according to the invention.
Figure 4:
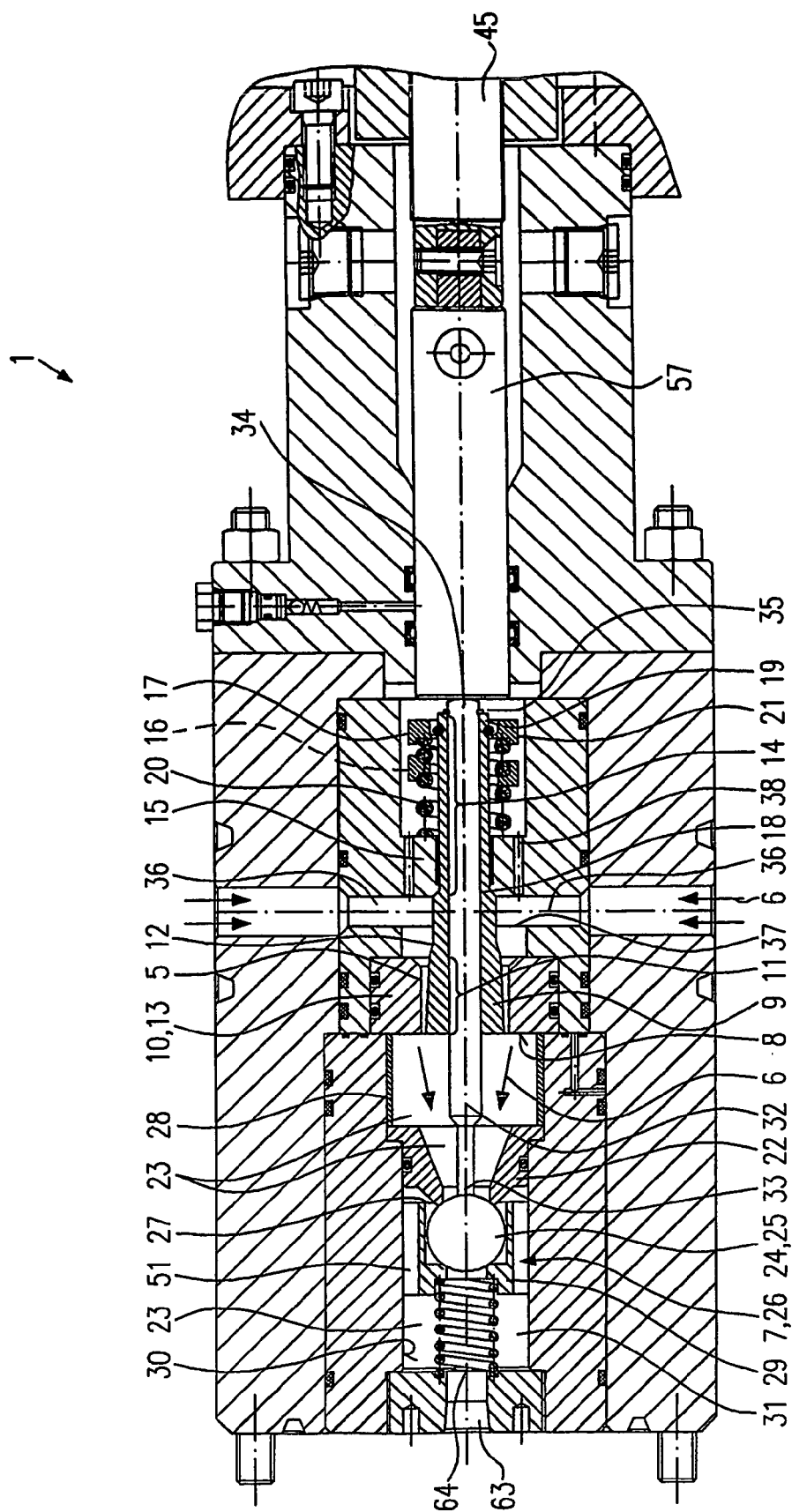

It should be noted that an adjustment device 3 according to FIG. 1 is also used in FIG. 4 in analogous form and that with both embodiments according to FIGS. 1 and 4, the same parts are labelled with the same reference symbols and sometimes are only mentioned together with one of the figures or also only depicted in connection with one figure.

With the longitudinal section through a first embodiment of a dosage feed device 1 according to the invention according to FIG. 1 the said dosage feed device exhibits an adjustment device 3. The adjustment device 3 comprises various drive groups or gear groups. A rod-shaped intervening link 57 of the adjustment device 3 is releasably joined at one end 58 to a threaded spindle 45 of a spindle drive 39. The threaded spindle 45 is supported for axial displacement in an associated spindle nut 44 as a further part of the threaded drive 39. Normally, the intervening link 57 and the threaded spindle 45 are movably arranged in the axial direction, but are arranged rotationally rigidly within an appropriate device housing 48.

The spindle nut 44 is partially inserted into a rotary sleeve 58 and attached to it releasably. The rotary sleeve is rotationally supported in a corresponding inner hole of the device housing 48 by means of oblique roller bearings. The rotation of the rotary sleeve 58 occurs by means of rotation of a flexible, approximately cup-shaped toothed sleeve 59 of a reduction gear 40 which is formed as a harmonic drive 41. At its open end on its outer side the toothed sleeve 59 exhibits teeth which engage corresponding inner teeth of a fixed ring element 60. Within the toothed sleeve 59 a wave generator 61 is arranged as a further part of the harmonic drive 41. This in each case widens oppositely located sections of the toothed sleeve so that its corresponding outer teeth engage the inner teeth of the ring element 60.

The wave generator 61 is rotationally rigidly joined to a first spur wheel 53 of a helically toothed spur gear 42. Corresponding helical teeth on the first spur wheel 53 engage helical teeth on a second spur wheel 54, whereby the second spur wheel 54 is arranged on a drive shaft 62 on which two motors 43 transfer their driving force.

Figure 2:
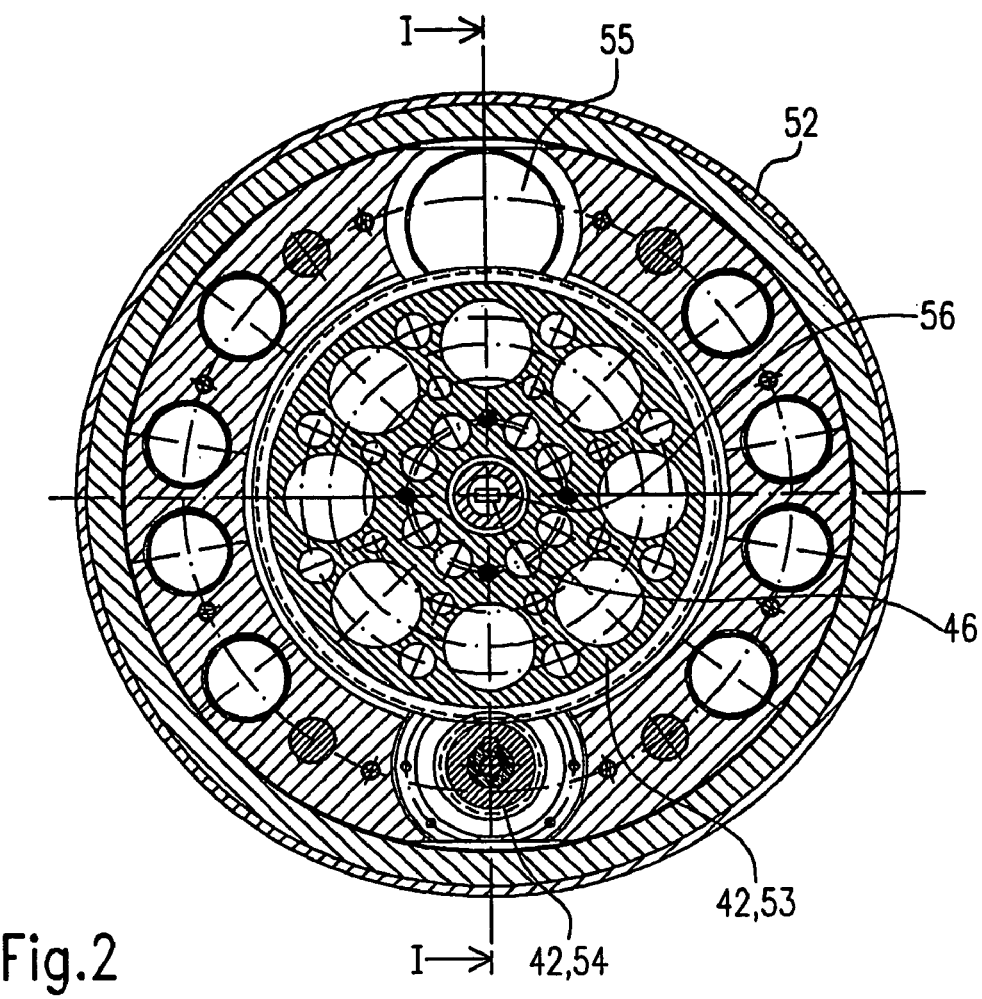
FIG. 2 a section along the line II-II in FIG. 1.

There is also the possibility of arranging a further second spur wheel with associated drive shaft 62 and motors 43 also in the empty space 55, refer to FIG. 2, or of arranging more than two second spur wheels with appropriately associated parts in the circumferential direction of the first spur wheel 53 in the device housing 48.

The threaded spindle 45 exhibits an inner hole on its side facing away from the intervening link 57 and a code carrier 46 of a position sensor 47 is at least partially inserted into the said inner hole and is releasably attached there. The code carrier 46 moves together with the threaded spindle 45 so that by detecting the movement of the code carrier 46, conclusions can be drawn about the movement of the threaded spindle 45, intervening link 57 and the displaceable sleeve 12 which is moved by it, refer to the other versions. The detection of the movement of the code carrier 46 occurs using appropriate sensor elements, which scan position-specific patterns on the code carrier 46, whereby these sensor elements are arranged in an end sleeve 56 of the corresponding position sensor 47.

The device housing 48 in the embodiment according to FIG. 1 exhibits on its housing outer side 52 a row of insertion bevels 49, which border a stepwise reducing cross-section of the device housing 48 in the direction to the left in FIG. 1. These insertion bevels act as insertion aids for the dosage feed device 1 when it is employed using a remotely controlled device, such as a remotely controlled vehicle, etc. in the area of a tree, for example on the sea bed. In this way the dosage feed device 1 can be replaced easily by remote control.

The appropriate embodiment according to FIG. 4 is mounted directly on the tree, whereby it can be sited together with the tree at the application location or it can be removed from there.

The actual dosage feed of an additive fluid 2 occurs at the end of the device housing 48 positioned to the left in FIG. 1. Here, it exhibits a discharge opening 63 through which the additive fluid 2 can be dosed into a dosage feed line 50. The appropriate raw material, such as the crude oil or natural gas produced, flows along this dosage feed line 50.

For the sake of simplicity appropriate feed lines for the additive fluid 2 are not illustrated in FIGS. 1 and 4. The dosing of the additive fluid 2 occurs by adjusting a dosing cone 9 in the axial direction, whereby the dosing cone 9 is part of a displaceable sleeve 12. Between the dosing cone 9 and a counter element 10 formed as a guide sleeve 13 an appropriate dosing gap 15 is formed, refer also to FIG. 4, which exhibits different opening areas 8 depending on the adjustment of the displaceable sleeve 12 in the axial direction.

Within the displaceable sleeve 12 an actuating plunger 32 is movably supported in the axial direction. It is in contact at one end with the intervening link 57 or is movably joined and in contact at its opposite end with a valve element 24 of a valve device 7. The valve device 7 is formed as a non-return valve 26.

With regard to the other details of the dosage feed device reference is made to FIG. 4.

FIG. 2 shows a section along the line II-II, whereby FIG. 1 corresponds to a section along the line I-I from FIG. 2. In FIG. 2 in particular the arrangement of the first and second spur wheels 53, 54 of the helically toothed spur gear can be seen. The end sleeve 56, in which the code carrier 46 is movably supported in the longitudinal direction is situated centrally in the first spur wheel 53.

In the circumferential direction of the first spur wheel 53, on one hand, the second spur wheel 54 is arranged as is also the empty space 55 for the further arrangement of a second spur wheel. Further such empty spaces 55 with appropriate second spur wheels, drive shafts, motors and similar equipment are possible, refer to FIG. 1.

Figure 3:
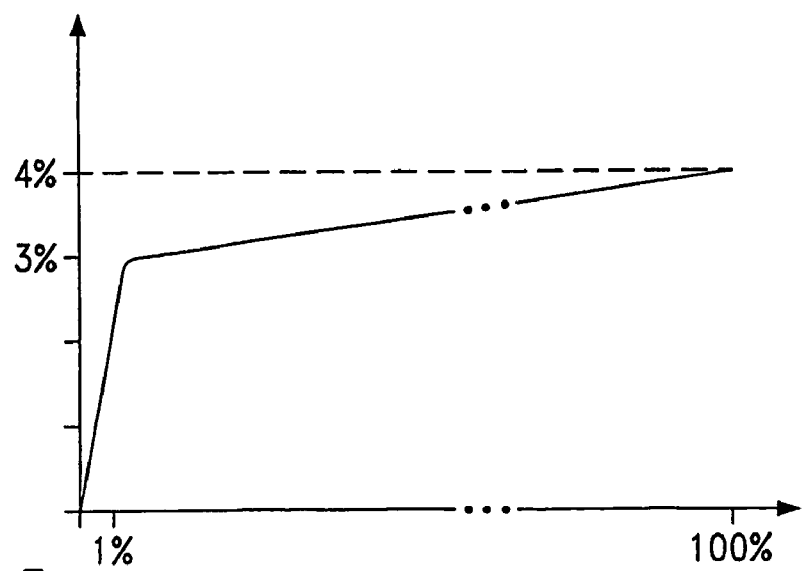
FIG. 3 a graph for illustrating the dependence of the displacement of an actuating plunger and the dosage feed amount of the additive fluid, and FIG. 4 a longitudinal section through a second embodiment of a dosage feed device according to the invention.

In FIG. 3 a graph shows the dependence of a displacement of the intervening link 57 or the threaded spindle 45 in the range from 0 to approx. 100% and a corresponding quantity of dosed additive fluid, whereby the corresponding dosage amount is set in relation to the quantity of raw material to which the additive fluid is dosed. Generally, it has been found that approximately 3% of additive fluid or inhibitor is sufficient, whereby if necessary, the amount is increased to 4%. According to the invention, there is the possibility of adding the 3% amount of the additive fluid to the raw material with just a very slight adjustment displacement (1% referred to the complete adjustment displacement) of the threaded spindle 45 and corresponding intervening link 57, whereby this occurs by adjustment of the valve element 24 by means of the actuating plunger 32. The 3% amount is defined by the opening area of the dosing gap 5. If a further adjustment of the threaded spindle 45 occurs in the axial direction (refer to the range between 1% and 100% on the horizontal axis in FIG. 3), then, refer to the description concerning FIG. 4, the opening area 8 of the dosing gap 5 is gradually increased, whereby the dosed amount of the additive fluid is then increased from 3% to 4% along this relatively long adjustment displacement.

In FIG. 4 a longitudinal section according to FIG. 1 is illustrated without the corresponding device housing 48 and adjustment device 3.

The displaceable sleeve 12 exhibits apart from the end section 11, in which the dosing cone 9 is formed, at least one further guide section 14, along which the displaceable sleeve 12 is supported in a supporting sleeve 15 movable in the axial direction. The movable support occurs between an extended position 16, refer to the dashed representation of a support ring 21, and a withdrawn position 17 illustrated in FIG. 4, refer here also to the corresponding arrangement of the support ring 21. For defining the withdrawn position 17, the displaceable sleeve 12 exhibits on its outer side an annular stop 18 which is in contact with the support sleeve 15 in the withdrawn position 17.

A compression spring 20, which exerts a force on the displaceable sleeve 12 in the direction of the withdrawn position 17, is supported between the supporting sleeve 15 and the support ring 21 arranged on a first sleeve end 19 of the displaceable sleeve 12. Between the dosing cone 9 and the essentially cylindrical guide sleeve 13 as counter element 10, the dosing gap 5 is formed which exhibits a defined opening area 8 in the withdrawn position 17 at its discharge end positioned downstream in the fluid flow direction 6. This opening area 8 is used for defining the 3% amount according to FIG. 3.

The guide sleeve 13 is supported in an appropriate receptacle on the support sleeve 15 and a spacer sleeve 28 is arranged between the guide sleeve 13 and a valve-seat sleeve 22. Both the spacer sleeve 28 and the valve-seat sleeve 22 border in their interiors an appropriate flow channel 23 for additive fluid 2.

At its end facing the valve device 4, the valve-seat sleeve 22 exhibits a circular shaped opening with an opening edge 27 with which the essentially spherical valve element 24 is in sealed contact in the valve-closed position 25 according to FIG. 4. The valve element 54 is arranged in an element receptacle 29 of the non-return valve 26, whereby this element receptacle 29 is subjected at its end facing the discharge opening 63 to a force from a compression spring 64 in the direction of the valve-closed position 25.

Between the element receptacle 29 and an inner side 30 of an appropriate housing hole 31, in which the non-return valve 26 is positioned, at least a fluid opening 51 is formed through which additive fluid 2 flows in the direction of the discharge opening 63 when the non-return valve is open.

There is the possibility of arranging one or many such fluid openings 51.

The actuating plunger 32 is movably supported in the axial direction within the valve-seat sleeve 22, the spacer sleeve 28 and the displaceable sleeve 12. It is in contact with the valve element 24 with its support end 33 allocated to the non-return valve 26. With its other movable end 34 it is in contact with or movably connected to the intervening link 57. In the valve-closed position 25 the actuating plunger 32 at its end section in the region of the movable end 34 protrudes from the first sleeve end 19 of the displaceable sleeve 12 by a certain delay length 35. When the intervening link 57 moves due to appropriate movement of the threaded spindle 45 in the axial direction, the actuating plunger 32 is first displaced without, due to the appropriate delay length 35, the displaceable sleeve 12 being displaced. Through this first displacement of the actuating plunger 32 the valve element 24 is moved out of the valve-closed position 25 by the support end 33 so that it is no longer in sealing contact at the opening edge 27. Through this movement of the valve element 24, the non-return valve 26 is opened and the amount of additive fluid 2 determined by the opening area 8 of the dosing cone 9 in the withdrawn position 17 of the displaceable sleeve 12 flows through the valve-seat sleeve 22 and fluid opening 51 in the direction of the discharge opening 63 and finally into the dosage feed line 50. Here, mixing with the produced raw material occurs.

With further movement of the intervening link 57 through further actuation of the adjustment device 3, refer also to FIG. 1, contact with the first sleeve end 19 of the displaceable sleeve 12 finally occurs together with its corresponding displacement in the axial direction in the direction of the discharge opening 63. Consequently the dosing cone 9 is also displaced relative to the guide sleeve 13, whereby the opening area 8 is enlarged. If the displaceable sleeve 12 is positioned in the extended position 16, the opening area 8 of the dosing gap 5 is enlarged so far that the 4% amount of the additive fluid according to FIG. 3 enters the dosage feed line 50 via the discharge opening 63. However, this increase in the additive fluid amount occurs only if required and only if the 3% amount is not sufficient.

With the failure of the adjustment device 3, automatic closure of the dosage feed device 1 occurs due to the spring pressure on the displaceable sleeve 12 in the direction of the withdrawn position 17 as well as the spring pressure of the non-return valve 26 in the direction of the valve-closed position 25.

According to the invention, the non-return valve 26 as a valve device 7, the valve-seat sleeve 22 and the displaceable sleeve 12 form a dosing element 4 with the dosing cone 9 and corresponding dosing gap 5.

The feed of the additive fluid 2 to the dosage feed device 1 occurs in an appropriate annular space 37 between the guide sleeve 13 and support sleeve 15, whereby appropriate feed holes or additive fluid guides 36 can extend radially outwards from the annular space at several points. In order to be able to feed additive fluid from the annular space 37 also in the direction of the first sleeve end 19 with the compression spring 20, the support sleeve 15 exhibits at least one connecting hole 38.

With regard to the embodiment according to FIG. 1 it is again pointed out that the functioning principle of the dosage feed device is according to the embodiment in FIG. 4, whereby analogously the adjustment device 3 according to FIG. 1 is used in the embodiment according to FIG. 4.

The invention claimed is:

1. Dosage feed device for the dosage feed of an additive fluid, the dosage feed device comprising:

a dosing element, which can be adjusted by an adjustment device;

the dosing element including a dosing gap and a valve device arranged following the dosing gap in a direction of fluid flow of the additive fluid, the valve device having an open and a closed position;

the dosing gap being formed between inner and outer members movable relative to one another by the adjustment device; and the valve device being movable from the closed position to the open position without adjusting the dosing gap and one of the inner or outer members being movable from a flow position to an adjustment flow position adjusting flow through the dosing gap.

2. Dosage feed device according to claim 1, wherein a flow area of the dosing gap is variable, whereby the flow area increases with movement of the inner member relative to the outer member in the direction of fluid flow of the additive fluid.

3. Dosage feed device according to claim 1, wherein the inner member is a dosing cone and the outer member is a counter element, whereby the dosing cone is moveable relative to the counter element in the direction of fluid flow of the additive fluid to increase a flow area of the dosing gap upon the valve device moving from the open position to the adjustment flow position.

4. Dosage feed device according to claim 1, wherein the dosing gap is an annular area around the dosing cone which changes in size as the dosing cone moves relative to the valve device.

5. Dosage feed device according to claim 1, wherein the adjustment device exhibits at least a spindle drive, a reduction gear, a helically toothed spur gear and a drive motor.

6. Dosage feed device according to claim 5, wherein the spindle drive exhibits a rotatable, but axially undisplaceable spindle nut and a rotationally rigid, but axially displaceable threaded spindle.

7. Dosage feed device according to claim 6, wherein a code carrier of a position sensor is assigned to the threaded spindle.

8. Dosage feed device according to claim 1, wherein a device housing includes two or more insertion bevels on the outer side of its housing and an inlet for the additive fluid positioned therebetween.

9. Dosage feed device for the dosage feed of an additive fluid, the dosage feed device comprising:

a dosing element, which can be adjusted by an adjustment device, and the dosing element including a dosing gap and a valve device arranged following the dosing gap in direction of fluid flow of the additive fluid;

wherein the dosing gap is formed between a dosing cone and counter element, whereby the dosing cone and counter element are movable relative to one another; and wherein the dosing cone is formed as the end section of a displaceable sleeve, the said end section appearing conical in the direction of fluid flow, whereby at least the end section is arranged for displacement in a guide sleeve as the counter element.

10. Dosage feed device according to claim 9, wherein a guide section of the displaceable sleeve is supported for displacement in a support sleeve between an extended position and a withdrawn position.

11. Dosage feed device according to claim 10, wherein the displaceable sleeve is subject to spring pressure in the direction of the withdrawn position.

12. Dosage feed device according to claim 10, wherein an especially annular stop protrudes radially outwards from the displaceable sleeve for defining the withdrawn position on the support sleeve.

13. Dosage feed device according to claim 10, wherein a compression spring is arranged between the support sleeve and a first sleeve end of the displaceable sleeve.

14. Dosage feed device according to claim 13, wherein a support ring is arranged on the first sleeve end.

15. Dosage feed device according to claim 13, wherein at least one additive fluid guide opens into an annular space of a flow channel between the guide sleeve and the support sleeve.

16. Dosage feed device according to claim 15, wherein at least one connecting hole penetrates the support sleeve in the direction of the first sleeve end from the annular space.

17. Dosage feed device according to claim 9, wherein a valve-seat sleeve is arranged between the valve device and the dosing gap in a flow channel, on which a valve element of the valve device contacts on one side in a valve-closed position.

18. Dosage feed device according to claim 17, wherein the valve device is a non-return valve which is subject to spring pressure in the direction of the valve-seat sleeve.

19. Dosage feed device according to claim 17, wherein the valve element is a spherical valve element that contacts an opening edge of the valve-seat sleeve, sealed tightly against fluids, in the valve-closed position.

20. Dosage feed device according to claim 17, wherein a spacer sleeve is arranged between the valve-seat sleeve and the guide sleeve.

21. Dosage feed device according to claim 20, wherein an actuating plunger is supported for displacement within the displaceable sleeve, spacer sleeve and valve-seat sleeve, which is in contact with the valve element at its support end.

22. Dosage feed device according to claim 21, wherein the actuating plunger is movably connected to the adjustment device with its moving end remote from its support end.

23. Dosage feed device according to claim 22, wherein the movable end protrudes by a certain delay length out of the first sleeve end of the displaceable sleeve.

24. Dosage feed device according to claim 17, wherein the valve element is arranged in a cup-shaped element receptacle, between which and an inner side of a housing hole at least one fluid opening is formed.

25. Dosage feed device according to claim 9, wherein the dosing gap includes a certain opening area in a withdrawn position of the displaceable sleeve.

26. A dosage feed device for the dosage feed of an additive fluid, the dosage feed device comprising:

a valve device adjustable by an adjustment device to an open position;

a dosing cone forming a dosing gap with a counter element, the valve device being arranged following the dosing cone in a direction of fluid flow of the additive fluid;

the valve device being adjustable by the adjustment device as the valve device moves to an open position without moving the dosing cone relative to the counter element; and the adjustment device moving the dosing cone to an adjustment position adjusting the dosing gap after the valve device has first moved to the open position.

* * * * *